United States Patent
Miyazaki et al.

(10) Patent No.: US 7,111,696 B2
(45) Date of Patent: Sep. 26, 2006

(54) LEGGED MOBILE ROBOT

(75) Inventors: Susumu Miyazaki, Wako (JP); Tomoko Otani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/515,928

(22) PCT Filed: Feb. 27, 2004

(86) PCT No.: PCT/JP2004/002441

§ 371 (c)(1),
(2), (4) Date: Nov. 24, 2004

(87) PCT Pub. No.: WO2004/087381

PCT Pub. Date: Oct. 14, 2004

(65) Prior Publication Data

US 2005/0167167 A1 Aug. 4, 2005

(30) Foreign Application Priority Data

Mar. 31, 2003 (JP) .............................. 2003-094984

(51) Int. Cl.
*B62D 51/06* (2006.01)
(52) U.S. Cl. ................. 180/8.5; 180/8.1; 180/8.2; 180/8.5; 180/8.6; 901/1; 74/490.3; 74/490
(58) Field of Classification Search ................ 180/8.1, 180/8.2, 8.5, 8.6; 901/1; 74/490.3, 490
See application file for complete search history.

(56) References Cited

U.S. PATENT DOCUMENTS

| | | | | |
|---|---|---|---|---|
| 4,738,583 A | * | 4/1988 | Macconochie et al. ..... 414/735 |
| 4,834,200 A | * | 5/1989 | Kajita ........................ 180/8.1 |
| 4,977,971 A | * | 12/1990 | Crane et al. ................. 180/8.3 |
| 5,318,471 A | * | 6/1994 | Glovier ...................... 446/268 |
| 5,455,497 A | * | 10/1995 | Hirose et al. .......... 318/568.12 |
| 5,513,106 A | * | 4/1996 | Yoshino et al. ............... 701/23 |
| 5,634,377 A | * | 6/1997 | Kimura et al. ........... 74/490.04 |
| 5,929,585 A | * | 7/1999 | Fujita ....................... 318/568.2 |

FOREIGN PATENT DOCUMENTS

| | | |
|---|---|---|
| JP | 3-184782 | 8/1991 |
| JP | 10-202561 | 8/1998 |
| JP | 2002-210682 | 7/2002 |
| JP | 2003-39350 | 2/2003 |
| JP | 2003-340770 | 12/2003 |

* cited by examiner

*Primary Examiner*—Lesley D. Morris
*Assistant Examiner*—Marlon Arce-Diaz
(74) *Attorney, Agent, or Firm*—Squire, Sanders and Dempsey, LLP

(57) ABSTRACT

In a legged mobile robot (10) having a motor (42) that rotates the ankle joint (26R (26L)) about a right-and-left axis of the robot (26RY (26LY)) and a speed reducer (58) that reduces speed of an output of the motor, wherein the motor is disposed at a same position as the knee joint (22R (22L)) or at the thigh link (16R (16L)) such that the speed reducer is disposed at the shank link. With this, it becomes possible to reduce the weight of the distal end of the leg (12R (12L)) can be reduced, whereby enabling to reduce the inertial force generated in the leg during movement or locomotion of the robot.

18 Claims, 11 Drawing Sheets

LEGGED MOBILE ROBOT

TECHNICAL FIELD TO WHICH THE INVENTION RELATES TO

The present invention relates to a legged mobile robot, and more specifically relates to the leg of a legged mobile robot.

BACKGROUND ART OF THE INVENTION

The technique described in Japanese Patent 2592340 (page 5, left column, FIG. 2, FIG. 6, etc.) is a known example of the technique relating to a legged mobile robot, particularly to the leg of a legged mobile robot. In this prior art, the configuration is such that an electric motor (80) for driving a knee joint is disposed at a thigh link (70), an electric motor (88) for driving an ankle joint is disposed at a shank link (86), and speed reducers (84)(92) disposed coaxially with the joints are driven by belts (82)(90), whereby the drive force necessary for walking is obtained.

When the legged mobile robot is moved, particularly when the robot is moved at a high speed, a strong inertial force is generated in the leg. Therefore, the weight of the leg, particularly on the distal end (specifically, the foot), is preferably light so that the inertial force generated in the leg during movement or locomotion is reduced. However, in the prior art described above, since the motor for driving the ankle joint is disposed at the shank link and the speed reducer for reducing the speed of the output thereof is disposed coaxially with the ankle joint, the distal end of the leg is heavy, which leaves room for improvement in terms of reducing the inertial force.

DISCLOSURE OF THE INVENTION

Therefore, an object of the present invention is to provide a legged mobile robot configured such that the distal end of the leg is made more lightweight, whereby the inertial force generated in the leg during movement or locomotion can be reduced.

In order to achieve the object, as stated in claim 1 to be hereinafter described, the present invention is configured to have a legged mobile robot having a leg including a knee joint that connects a thigh link and a shank link and an ankle joint that connects the shank link and a foot, such that it moves by driving the leg, comprising: a motor that rotates the ankle joint about a right-and-left axis of the robot, and a speed reducer that reduces speed of an output of the motor, wherein the motor is disposed at a same position as the knee joint or at the thigh link such that the speed reducer is disposed at the shank link.

A strong or large drive force is needed to rotate the ankle joint of the robot about the right-and-left axis (the right-and-left direction perpendicular to the robot advancing direction). Therefore, generally a large and heavy motor is selected to rotate the ankle joint about the right-and-left axis. Therefore, as stated in claim 1 to be hereinafter described, the motor is disposed at a same position as the knee joint or at the thigh link such that the speed reducer is disposed at the shank link, whereby the weight of the distal end of the leg can be reduced (the barycentric position of the leg can be positioned far away from the distal end), and therefore the inertial force generated in the leg during movement or locomotion of the robot can be reduced. The reason the speed reducer is disposed at the shank link is because having too many components disposed at the thigh link may have an adverse effect on the external appearance of the leg, and also because it prevents legs from tending to interfere with each other when a plurality of legs are provided.

Also, as stated in claim 2 to be hereinafter described, the present invention is configured such that the motor is disposed at the thigh link, and the output of the motor is transmitted to the speed reducer through an intermediate shaft disposed coaxially with an axis of the knee joint.

Thus, in this configuration, the motor that rotates the ankle joint of the robot about the right-and-left axis is disposed at the thigh link, and the output thereof is transmitted to the speed reducer through an intermediate shaft disposed coaxially with the axis of the knee joint (more specifically, the right-and-left axis; that is, the axis parallel to the right-and-left axis of the ankle joint). Therefore, in addition to the effects described in claim 1, the output of the motor can be reliably transmitted to the speed reducer even when the knee joint is driven and the relative positions of the speed reducer and the motor vary. Furthermore, the external appearance of the leg is not adversely affected because the structure is compact.

Also, as stated in claim 3 to be hereinafter described, the present invention is configured such that, at least one of a first transmission element that transmits rotation of the intermediate shaft to the speed reducer, and a second transmitting element that transmits an output of the speed reducer to the right-and-left axis of the ankle joint, is disposed inside the shank link.

Thus, in this configuration, at least either the first transmission element that transmits the rotation of the intermediate shaft disposed coaxially with the axis of the knee joint to the speed reducer, or the second transmission element that transmits the output of the speed reducer to the right-and-left axis of the ankle joint is disposed inside the shank link (specifically, within the external outline of the shank link). Therefore, in addition to the effects described in claim 1 and elsewhere, the structure is made more compact and the external appearance of the leg is not adversely affected.

Also, as stated in claim 4 to be hereinafter described, the present invention is configured such that, the second transmission element comprises a rod mechanism that connects the output shaft of the speed reducer to the right-and-left axis of the ankle joint by a rod.

Thus, the second transmission element that transmits the output of the speed reducer to the right-and-left axis of the ankle joint comprises a rod mechanism wherein the output shaft of the speed reducer and the right-and-left axis of the ankle joint are connected by a rod (made of rigid member). Therefore, in addition to the effects described in claim 1 and elsewhere, a strong or large drive force outputted from the speed reducer can be reliably transmitted to the right-and-left axis.

Also, as stated in claim 5 to be hereinafter described, the present invention is configured such that, the rod mechanism comprises: a first crank whose midpoint is fixed to the output shaft of the speed reducer, a second crank whose midpoint is fixed to the right-and-left axis of the ankle joint, a first rod connected to one end of the first crank and connected to one end of the second crank, and a second rod connected to the other end of the first crank and connected to the other end of the second crank.

Thus, the rod mechanism that transmits the output of the speed reducer to the right-and-left axis of the ankle joint comprises a first crank whose midpoint is fixed to the output shaft of the speed reducer, a second crank whose midpoint is fixed to the right-and-left axis of the ankle joint, a first rod that connects one end of the first crank and one end of the second crank, and a second rod that connects the other end of the first crank and the other end of the second crank. Therefore, the first rod and the second rod are displaced in opposite directions by the rotation of the first crank. When converted to the rotational force of the second crank, the displacement acts such that the transmissive forces supplement each other, making it possible to improve the transmission efficiency in addition to the effects described in claim 1 and elsewhere. Furthermore, reliability can be improved because even when one rod is damaged, the output of the speed reducer can be transmitted to the right-and-left axis of the ankle joint by the other rod.

Also, as stated in claim 6 to be hereinafter described, the present invention is configured such that, a distance between the first rod and the second rod is set to a value smaller than a width of the shank link.

Thus, in this configuration, since the distance between the first rod and the second rod is set to a smaller value than the width of the shank link, in addition to the effects described in claim 1 and elsewhere, the structure is more compact and the external appearance of the leg is not adversely affected.

Also, as stated in claims 7 and 8 to be hereinafter described, the present invention is configured such that, an angle formed by the one end, the midpoint and the other end of the first crank, and an angle formed by the one end, the midpoint and the other end of the second crank are each set to approximately 180 degrees.

Thus, in this configuration, the angle formed by the one end, the midpoint, and the other end of the first crank, and the angle formed by the one end, the midpoint, and the other end of the second crank are each set to about 180 degrees, or in other words, the rod mechanism is a parallel link mechanism. Therefore, no additional stress is applied to the bearings for supporting the right-and-left axis of the ankle joint because the transmissive force of the first rod and the transmissive force of the second rod balance each other out (constitute a couple of forces).

Also, as stated in claims 9 and 10 to be hereinafter described, the present invention is configured such that, an angle formed by the one end, the midpoint and the other end of the first crank, and an angle formed by the one end, the midpoint and the other end of the second crank are varied in response to a gait when the robot moves.

Thus, in this configuration, the angle formed by the one end, the midpoint, and the other end of the first crank, and the angle formed by the one end, the midpoint, and the other end of the second crank vary in response to the gait pattern of the mobile robot. Therefore, in addition to the effects described in claim 1 and elsewhere, the output of the speed reducer can be converted to the rotational force of the right-and-left axis of the ankle joint with maximum efficiency when maximum torque must be generated in the right-and-left axis. Therefore, the motor and speed reducer can be made smaller, the distal end of the leg can be made more lightweight to reduce the inertial force generated during movement or locomotion, and the structure can be made more compact to prevent the external appearance of the leg from being adversely affected.

Also, as stated in claims 11 and 12 to be hereinafter described, the present invention is configured such that, the angle formed by the one end, the midpoint and the other end of the first crank, and the angle formed by the one end, the midpoint and the other end of the second crank are set based on a torque exerted on the foot around a time when the leg is landed on a floor and around a time when the leg is lifted from the floor.

Thus, in this configuration, the angle formed by the one end, the midpoint, and the other end of the first crank, and the angle formed by the one end, the midpoint, and the other end of the second crank are set based on the torque exerted on the foot around the time when the leg is landed on the floor and around the time when the leg is lifted from the floor. Therefore, in addition to the effects described in claim 1 and elsewhere, the output of the speed reducer can be converted to the rotational force of the right-and-left axis of the ankle joint with maximum efficiency around the time when the leg is landed on the floor and around the time when the leg is lifted from the floor when maximum torque must be generated in the right-and-left axis. Therefore, the motor and speed reducer can be made smaller, the distal end of the leg can be made more lightweight to reduce the inertial force generated during movement or locomotion, and the structure can be made more compact to prevent the external appearance of the leg from being adversely affected.

Also, as stated in claims 13 through 16 to be hereinafter described, the present invention is configured such that, it further includes: an angle vary mechanism provided at the first crank and second crank and varying the angles formed by the one ends, the midpoints, and the other ends of the first and second cranks.

Thus, since the first crank and second crank are provided with an angle varying mechanism that varies the angles formed by the one ends, the midpoints, and the other ends, the angles can be easily varied in addition to obtaining the effects described in claim 1 and elsewhere.

Also, as stated in claim 17 to be hereinafter described, the present invention is configured to have a legged mobile robot having a leg including a knee joint that connects a thigh link and a shank link and an ankle joint that connects the shank link and a foot, such that it moves by driving the leg, comprising: a first motor that rotates the ankle joint about a right-and-left axis of the robot, and a second motor that rotates the ankle joint about a back-and-forth axis of the robot, wherein the first and second motors are disposed at the thigh link such that an output of the first motor is transmitted to the right-and-left axis of the ankle joint through a first intermediate shaft disposed on a same axis as the ankle joint, while an output of second motor is transmitted to the back-and-forth axis of the ankle joint through a second intermediate shaft disposed on the same axis as the ankle joint.

Thus, in this configuration, the first motor that rotates the ankle joint about the right-and-left axis (right-and-left direction perpendicular to the robot advancing direction) and the second motor that rotates the ankle joint about the back-and-forth axis (robot advancing direction) are both disposed at the thigh link. Therefore, the distal end of the leg can be made more lightweight (the barycentric position of the leg can be positioned far away from the distal end) to reduce the inertial force generated in the leg of the mobile robot. Also in this arrangement, since the outputs of the first motor and the second motor are transmitted to each axis of the ankle joint through a first intermediate shaft and a second intermediate shaft disposed coaxially with the axis of the knee joint, the output of the motors can be reliably transmitted to the ankle joint even when the knee joint is driven and the relative positions of the motors and the ankle joint have changed. Furthermore, since the structure is more compact, there is no adverse effect on the external appearance of the leg.

Also, as stated in claim 18 to be hereinafter described, the present invention is configured to have a legged mobile robot having a leg including a knee joint that connects a thigh link and a shank link and an ankle joint that connects the shank link and a foot, such that it moves by driving the leg, comprising: a first motor that rotates the ankle joint about a right-and-left axis of the robot, and a second motor that rotates the ankle joint about a back-and-forth axis of the robot, wherein the first motor is disposed at a same position as the knee joint or at the thigh link in such a manner that the first motor is disposed at the thigh link at a position that is farther away from the knee joint than the second motor.

Thus, a stronger or larger drive force is required to rotate the ankle joint of the robot about the right-and-left axis (right-and-left direction perpendicular to the robot advancing direction) than to rotate the ankle joint about the back-and-forth axis (robot advancing direction). Therefore, generally a motor that is larger and heavier than the motor used to rotate the ankle joint about the back-and-forth axis is selected for the motor used to rotate the ankle joint about the right-and-left axis. Accordingly, as stated in claim 18 to be hereinafter described, a configuration is provided such that the second motor that rotates the ankle joint about the back-and-forth axis is disposed at the same position as the knee joint or at the thigh link, and the output of the first motor for rotating the ankle joint about the right-and-left axis is disposed at the thigh link at a position separated from the knee joint than the second motor (specifically, a position far away from the distal end of the leg), whereby the distal end of the leg can be made more lightweight (the barycentric position of the leg can be positioned far away from the distal end) to reduce the inertial force generated in the leg during movement or locomotion.

DETAILED DESCRIPTION OF THE PREFERRED EMBODIMENTS

The legged mobile robot according to an embodiment of the present invention will now be described with reference to the accompanying diagrams.

Figure 1:
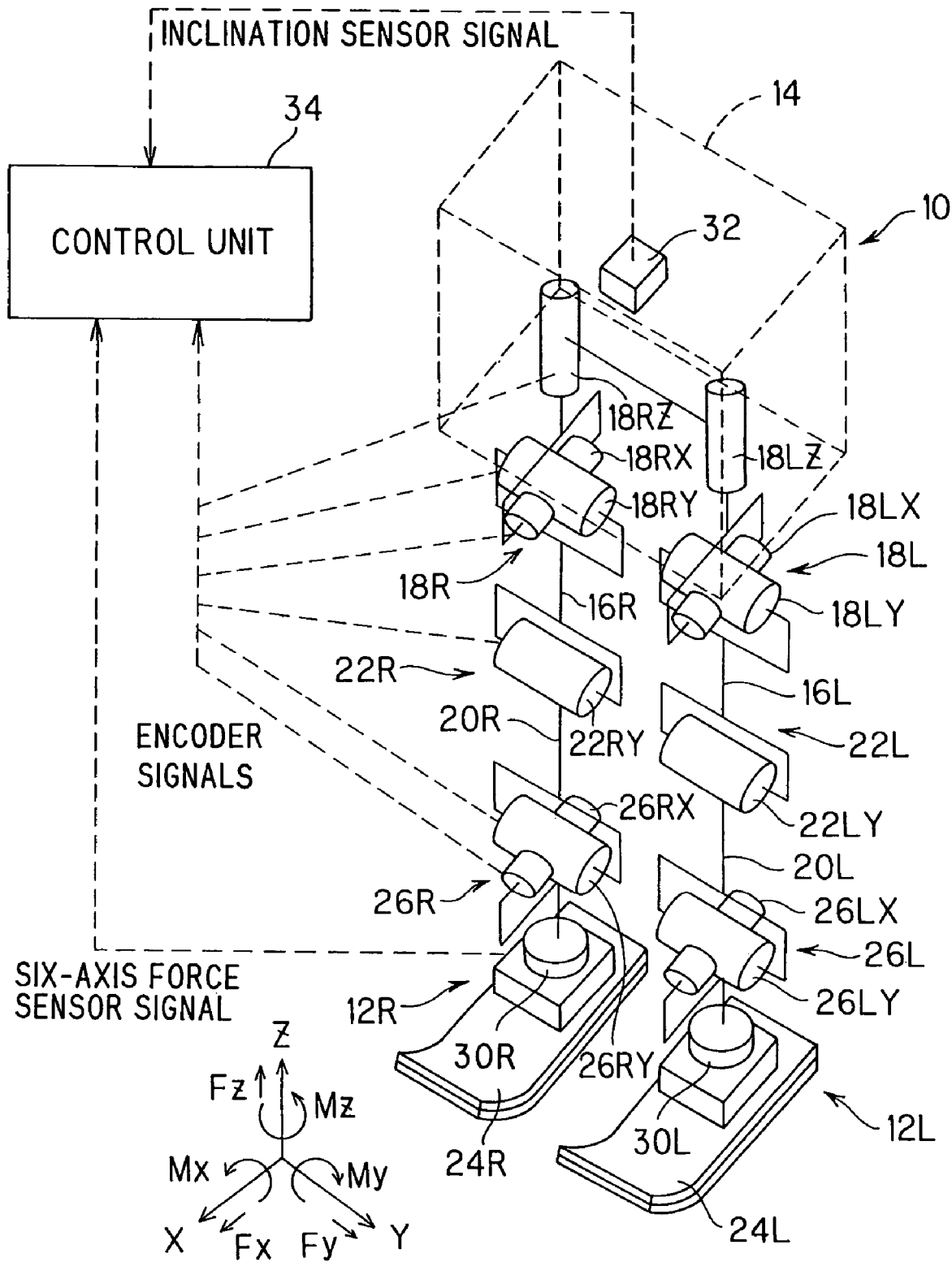
FIG. 1 is a schematic view of a legged mobile robot according to an embodiment of the present invention, with an emphasis on the joint structure of the leg.

FIG. 1 is a schematic view showing a legged mobile robot according to this embodiment, that is, a biped walking robot, with an emphasis on the joint structure of the leg.

As is shown in the drawing, the biped walking robot (hereinafter referred to as "robot") 10 includes right and left legs 12R and 12L (the right side is R, and the left side is L; same hereinafter). The right and left legs 12R and 12L have, respectively, hip joints 18R and 18L for connecting a body 14 and thigh links 16R and 16L, knee joints 22R and 22L for connecting the thigh links 16R and 16L with shank links 20R and 20L, and ankle joints 26R and 26L for connecting the shank links 20R and 20L with feet 24R and 24L.

The hip joints 18R and 18L are composed specifically of hip Z-axles 18RZ and 18LZ for rotating the distal ends of the thigh links 16R and 16L (the foot sides) about the gravity axis (Z-axis), hip X-axles 18RX and 18LX for rotating the distal ends of the thigh links 16R and 16L about (in the rolling direction) the back-and-forth axis (the X-axis; specifically, the robot advancing direction), and hip Y-axles 18RY and 18LY for rotating the distal ends of the thigh-links 16R and 16L about (in the pitch direction) the right-and-left axis (the Y-axis; specifically, the direction perpendicular to the advancing direction and the direction of gravity).

The knee joints 22R and 22L are composed of knee Y-axes 22RY and 22LY for rotating the distal ends of the shank links 20R and 20L about the right-and-left axis. The ankle joints 26R and 26L are composed of ankle X-axes 26RX and 26LX for rotating the feet 24R and 24L about the back-and-forth axis, and ankle Y-axes 26RY and 26LY for rotating the feet 24R and 24L about the right-and-left axis. The above-described axes are driven by electric motors (not shown in the diagrams; hereinafter partially described).

Conventional six-axis force sensors 30R and 30L are mounted between the ankle joints 26R and 26L and the feet 24R and 24L. These sensors are used to measure the three-directional force components Fx, Fy, and Fz and the three-directional moment components Mx, My, and Mz; to detect whether the legs 12R and 12L are in contact with the floor; and to detect the floor reaction force or the like exerted on the legs 12R and 12L from the floor surface. Also, an inclination sensor 32 is installed 6n the body 14, and this sensor detects the inclination and angular velocity of the robot 10 relative to the Z-axis. Each electric motor for driving the axes is provided with a rotary encoder (not shown) for detecting the amount of rotation.

The outputs of the six-axis force sensors 30R and 30L, the inclination sensor 32, and the like are inputted to a control unit 34 housed in the body 14. The control unit 34 calculates a manipulated variable for each electric motor for driving the axes on the basis of the data stored in memory (not shown) and the inputted detection value.

Thus, the right and left legs 12R and 12L of the robot 10 have six axes (degrees of freedom), and the electric motors for driving the 6×2=12 axes are operated based on the manipulated variable calculated by the control unit 34, whereby the entire leg can be endowed with the desired movement or locomotion and can move arbitrarily within a three-dimensional space. An arm and head such as those described in PCT International Publication Pamphlet WO 02/40226 A1, for example, are connected to the body 14. However, since the structures thereof have no direct relationship to the essential aspects of the present invention, illustrations and descriptions thereof are omitted.

Next, the legs 12R and 12L of the robot 10 will be described in detail with reference to FIG. 2 and subsequent figures. The leg 12R on the right side will be described below as an example, but since the right and left legs 12R and 12L are symmetrical, the following description also applies to the leg 12L on the left side.

Figure 2:
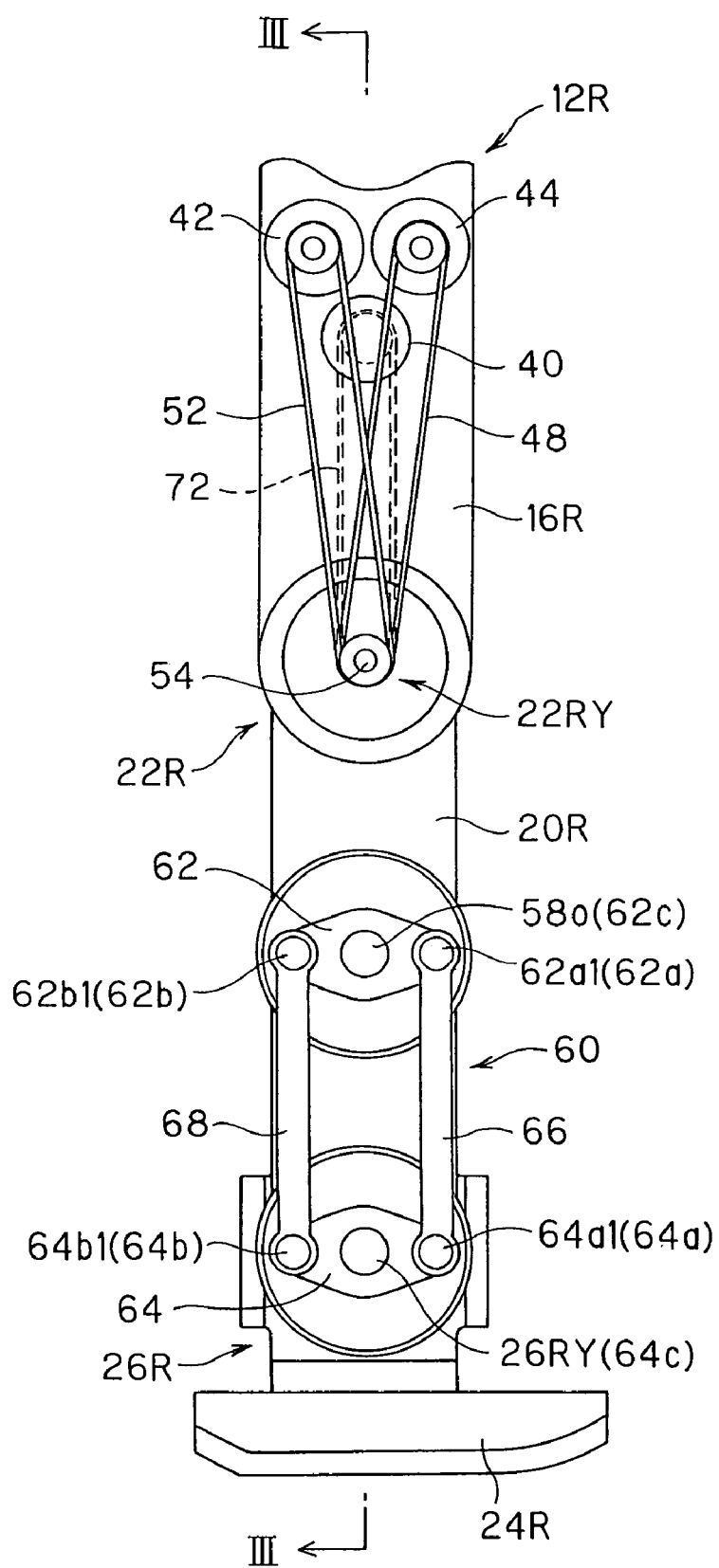
FIG. 2 is a right-hand side view showing in detail the right leg of the robot shown schematically in FIG. 1.
Figure 3:
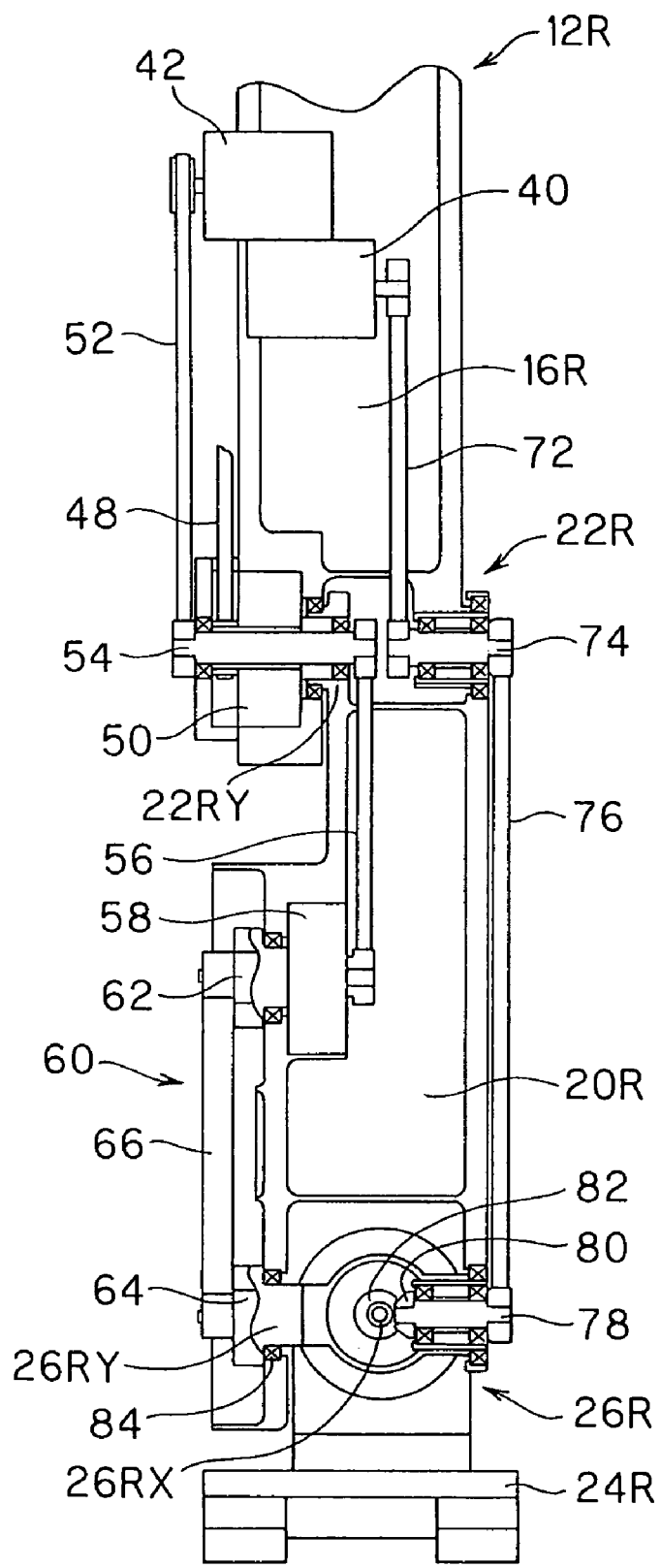
FIG. 3 is a cross-sectional view taken along the line III—III in FIG. 2.

FIG. 2 is a right-hand side view showing in detail the leg 12R shown schematically in FIG. 1. FIG. 3 is a cross-sectional view along the line III—III in FIG. 2.

As shown in both diagrams, an electric motor (hereinafter referred to as "ankle X-axis electric motor") 40 for driving the X-axis (hereinafter referred to as "ankle X-axis") 26RX of the ankle joint 26R is disposed at the thigh link 16R. Also, in the thigh link 16R, an electric motor (hereinafter referred to as "ankle Y-axis electric motor") 42 for driving the Y-axis (hereinafter referred to as "ankle Y-axis") 26RY of the ankle joint 26R, and an electric motor (hereinafter referred to as "knee Y-axis electric motor") 44 for driving the Y-axis (hereinafter referred to as "knee Y-axis") 22RY of the knee joint 22R are disposed at positions each separated from the knee joint 22R by the ankle X-axis electric motor 40 (specifically, upward in the direction of gravity).

The output (rotation output) of the knee Y-axis electric motor 44 is transmitted via a belt (hereinafter referred to as "knee Y-axis belt") 48 to a speed reducer (hereinafter referred to as "knee Y-axis speed reducer") 50 disposed coaxially with the knee Y-axis 22RY. The output reduced in speed by the knee Y-axis speed reducer 50 is directly transmitted to the knee Y-axis 22RY. Thus, the output of the knee Y-axis electric motor 44 disposed at the thigh link 16R is transmitted to the knee Y-axis 22RY via the knee Y-axis belt 48 and the knee Y-axis speed reducer 50.

Also, the output (rotation output) of the ankle Y-axis electric motor 42 is transmitted via a belt (hereinafter referred to as "first ankle Y-axis belt") 52 to an intermediate shaft (hereinafter referred to as "ankle Y-axis intermediate shaft") 54 disposed coaxially with the knee Y-axis 22RY. The rotation of the ankle Y-axis intermediate shaft 54 is transmitted via a belt (the aforementioned first transmission element; hereinafter referred to as "second ankle Y-axis belt") 56 to a speed reducer (hereinafter referred to as "ankle Y-axis speed reducer") 58 disposed at the shank link 20R. The second ankle Y-axis belt 56 is disposed inside the shank link 20R, or, specifically, within the external outline thereof. Also, the ankle Y-axis speed reducer 58 is disposed such that the output shaft 58o thereof is parallel to the Y-axis direction.

The output reduced in speed by the ankle Y-axis speed reducer 58 is transmitted to the ankle Y-axis 26RY via a rod mechanism (the aforementioned second transmission element) 60. The rod mechanism 60 is composed of a first crank 62, a second crank 64, a first rod 66, and a second rod 68, all made of rigid members.

To give a detailed description, the first crank 62 having a diamond shape as seen in a plan view is fixed to the output shaft 58o of the ankle Y-axis speed reducer. The first crank 62 has a pin joint 62a1 formed at one end 62a thereof (the end positioned forward in the advancing direction of the robot 10), and a pin joint 62b1 formed at the other end 62b (the end positioned backward in the advancing direction of the robot 10). The first crank 62 is fixed to the output shaft 58o of the ankle Y-axis speed reducer at the midpoint between the one end 62a and the other end 62b, or, specifically, at the midpoint 62c between the pin joint 62a1 formed at one end and the pin joint 62b1 formed at the other end. Also, the one end 62a, the midpoint 62c, and the other end 62b of the first crank 62 are set such that the angle formed thereby is 180 degrees, or, specifically, such that they are disposed on the same straight line. In other words, the phase difference between the rotational trajectories of the pin joint 62a1 formed at one end and the pin joint 62b1 formed at the other end is set to 180 degrees.

The second crank 64 is fixed to the ankle Y-axis 26RY. Also, the second crank 64 has a diamond shape as seen in a plan view, and has a pin joint 64a1 formed at one end 64a thereof (the end positioned forward in the advancing direction of the robot 10), and a pin joint 64b1 formed at the other end 64b (the end positioned backward in the advancing direction of the robot 10). The second crank 64 is fixed to the ankle Y-axis 26RY at the midpoint between the one end 64a and the other end 64b, or, specifically, at the midpoint 64c between the pin joint 64a1 formed at one end and the pin joint 64b1 formed at the other end. The one end 64a, the midpoint 64c, and the other end 64b are set such that the angle formed thereby is 180 degrees, or, specifically, such that they are disposed on the same straight line. In other words, the phase difference between the rotational trajectories of the pin joint 64a1 formed at one end and the pin joint 64b1 formed at the other end is set to 180 degrees.

The distance between the pin joint 62a1 formed at one end of the first crank and the pin joint 62b1 formed at the other end, and the distance between the pin joint 64a1 formed at one end of the second crank and the pin joint 64b1 formed at the other end are set to a value that is less than the width of the shank link 20R (the width in the X-axis direction).

The pin joint 62a1 formed at one end of the first crank and the pin joint 64a1 formed at one end of the second crank are connected via the first rod 66. Also, the pin joint 62b1 formed at the other end of the first crank and the pin joint 64b1 formed at the other end of the second crank are connected via the second rod 68 disposed parallel to the first rod 66. Specifically, the rod mechanism 60 is a parallel link mechanism (parallel crank mechanism). Since the distance between the pin joint 62a1 and the pin joint 62b1 formed on the first crank, and the distance between the pin joint 64a1 and the pin joint 64b1 formed on the second crank are set to a value that is less than the width of the shank link 20R (the width in the X-axis direction), the distance between the first rod 66 and the second rod 68 is also set to a value less than the width of the shank link 20R (the width in the X-axis direction).

Thus, the output of the ankle Y-axis electric motor 42 disposed at the thigh link 16R is transmitted to the ankle Y-axis 26RY via the first ankle Y-axis belt 52, the ankle Y-axis intermediate shaft 54, the second ankle Y-axis belt 56, the ankle Y-axis speed reducer 58, and the rod mechanism 60.

Also, the output (rotation output) of the ankle X-axis electric motor 40 is transmitted via a belt (hereinafter referred to as "first ankle X-axis belt") 72 to an intermediate shaft (hereinafter referred to as "ankle X-axis intermediate shaft") 74 disposed coaxially with the knee Y-axis 22RY. The rotation of the ankle X-axis intermediate shaft 74 is transmitted via a belt (hereinafter referred to as "second ankle X-axis belt") 76 to a driven shaft 78 disposed parallel to the ankle Y-axis 26RY.

A drive bevel gear 80 is fixed to the end of the driven shaft 78, and the drive bevel gear 80 meshes with a driven bevel gear 82 fixed to the end of the ankle X-axis 26RX. Specifically, the output of the ankle X-axis electric motor 40 disposed at the thigh link 16R is transmitted to the ankle X-axis 26RX via the first ankle X-axis belt 72, the ankle X-axis intermediate shaft 74, the second ankle X-axis belt 76, the driven shaft 78, the drive bevel gear 80, and the driven bevel gear 82.

Figure 4:
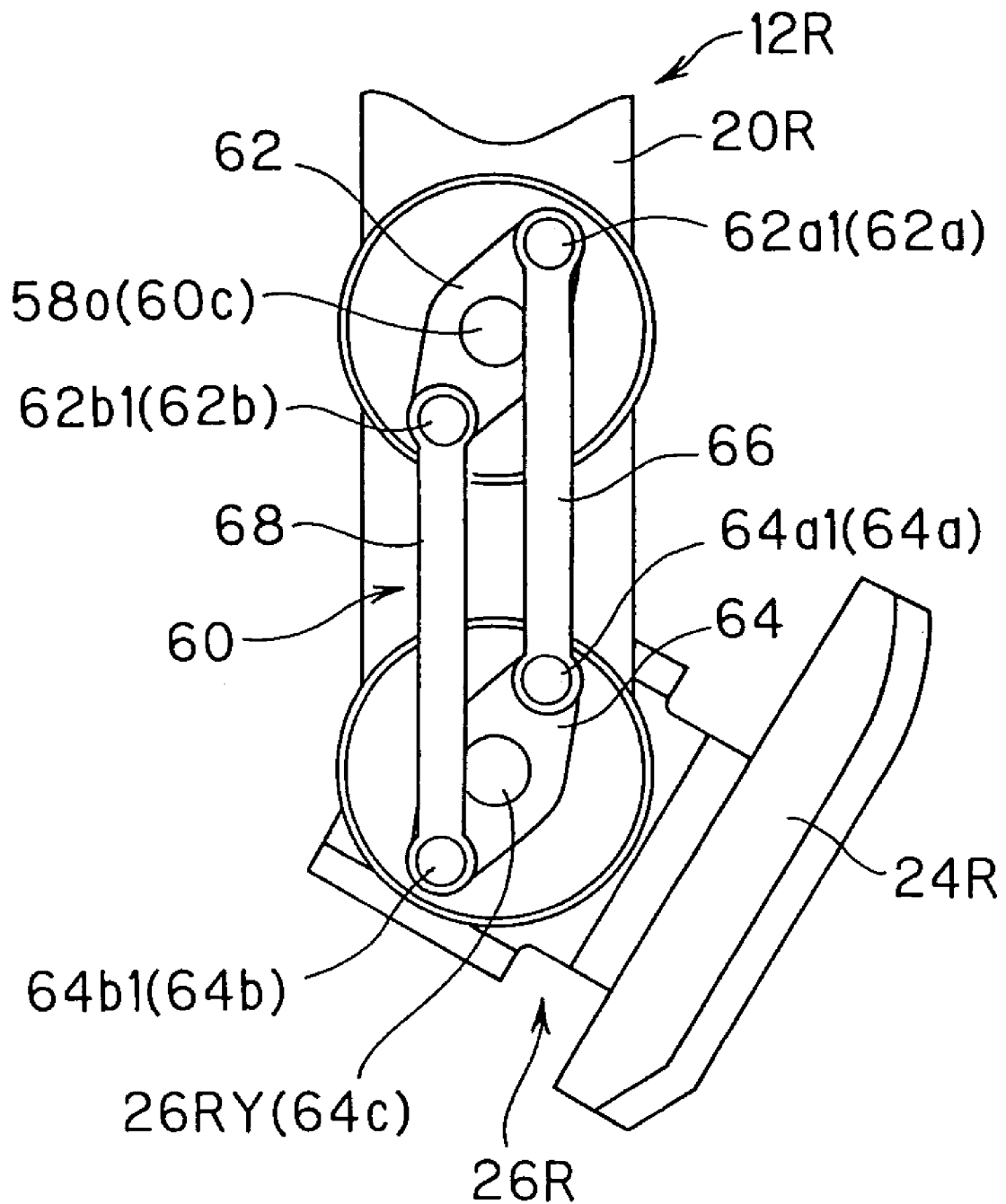
FIG. 4 is a right-hand side view showing the distal end from the shank link when the Y-axis of the ankle shown in FIG. 2 has been rotated by −60 degrees.

Now, to describe the driving (rotation) of the ankle joint 26R about the ankle Y-axis 26RY, the ankle Y-axis electric motor 42 produces rotation output, whereby the first crank 62 fixed to the output shaft 58o of the ankle Y-axis speed reducer rotates via the first ankle Y-axis belt 52, the ankle Y-axis intermediate shaft 54, and the second ankle Y-axis belt 56. When the first crank 62 rotates, the first rod 66 connected to one end 62a thereof and the second rod 68 connected to the other end are displaced in opposite directions, whereby rotational force (couple of forces) is produced in the second crank 64. The ankle Y-axis 26RY is thereby driven (rotated), and the relative positions (angles) of the foot 24R and the shank link 20R change, as shown in FIG. 4. FIG. 4 is a right-hand side view showing the distal end from the shank link 20R when the ankle Y-axis 26RY has been rotated −60 degrees. (In this embodiment, rotation in the direction in which the ankle joint 26R is bent has a negative (minus) rotation angle, and rotation in the direction in which the ankle joint 26R is extended has a positive (plus) rotation angle.)

Thus, in the legged mobile robot according to this embodiment, the ankle Y-axis electric motor 42 for rotating the ankle Y-axis 26RY (26LY) of the robot 10 is disposed at the thigh link 16R (16L), and the ankle Y-axis speed reducer 58 for reducing the speed of output of the ankle Y-axis electric motor 42 is disposed at the shank link 20R (20L). Therefore, the distal end (floor contact side; specifically, the side of the foot 24R (24L)) of the leg 12R (12L) can be made more lightweight; in other words, the barycentric position of the leg 12R (12L) can be positioned farther from the distal end, whereby the inertial force generated in the leg 12R (12L) when the robot 10 moves can be reduced.

The reason that the ankle Y-axis speed reducer 58 is disposed at the shank link 20R (20L) is to prevent situations in which the external outline of the thigh portion is enlarged, the external appearance of the leg 12R (12L) is in danger of being adversely affected, and the right and left legs 12R and 12L are more likely to interfere with each other if too many components are disposed at the thigh link 16R (16L), as shown in FIG. 2 of Japanese Patent Application No. 2002-248467, for example.

Furthermore, since the ankle X-axis electric motor 40 for rotating the ankle X-axis 26RX (26LX) is disposed at the thigh link 16R (16L), the weight of the distal end of the leg 12R (12L) can be further reduced, whereby the inertial force generated in the leg 12R (12L) of the mobile robot 10 can be made even smaller.

Moreover, a larger drive force is needed to rotate the ankle joint of the legged mobile robot about the right-and-left axis (Y-axis) than is needed to rotate the ankle joint about the back-and-forth axis (X-axis). For this reason, the ankle Y-axis electric motor 42 that is slightly larger and heavier than the ankle X-axis electric motor 40 is selected as illustrated. In this embodiment, therefore, the ankle Y-axis electric motor 42 is disposed at a position separated from the knee joint 22R (22L) by the ankle X-axis electric motor 40 (specifically, a position farther away from the foot 24R (24L) (next to the hip joint 18R (18L))). The weight of the distal end of the leg 12R (12L) can thereby be further reduced, whereby the inertial force generated in the leg 12R (12L) during movement or locomotion can be made even smaller.

If the ankle Y-axis electric motor 42 and ankle X-axis electric motor 40 for driving the ankle joint 26R (26L) are disposed at the thigh link 16R (16L), a resulting drawback is that the relative positions of the motors and the ankle joint 26R (26L) change when the knee joint 22R (22L) is driven. In view of this, the present embodiment is configured such that the outputs of the ankle Y-axis electric motor 42 and ankle X-axis electric motor 40 are transmitted to the ankle Y-axis 26RY (26LY) and the ankle X-axis 26RX (26LX) via the ankle Y-axis intermediate shaft 54 and the ankle X-axis intermediate shaft 74 disposed coaxially with the knee Y-axis 22RY (22LY). The outputs of the motors can thereby be reliably transmitted to the ankle joint 26R (26L) because the relative positions of the motors and the intermediate shafts, as well as the relative positions of the intermediate shafts and the ankle joint 26R (26L) do not change even when the knee joint 22R (22L) is driven and the relative positions of the motors and the ankle joint 26R (26L) have changed. Furthermore, the external appearance of the leg 12R (12L) is not adversely affected because the structure is more compact.

Further, since the second ankle Y-axis belt 56 for transmitting the rotation of the ankle Y-axis intermediate shaft 54 to the ankle Y-axis speed reducer 58 is disposed inside the shank link 20R (20L), the structure can be made more compact, whereby the external appearance of the leg 12R (12L) is not adversely affected. Also, since the distance between the first rod 66 and the second rod 68 is set to a value less than the width of the shank link 20R (20L), the structure can be made even more compact, whereby the external appearance of the leg 12R (12L) is not adversely affected.

Furthermore, since the output of the ankle Y-axis speed reducer 58 is transmitted to the ankle Y-aixs 26RY (26LY) by two rods composed of rigid members, a strong or large drive force outputted from the ankle Y-axis speed reducer 58 can be reliably transmitted.

Also, the first rod 66 and the second rod 68 are displaced in opposite directions, whereby the transmission efficiency can be improved because the mutual transmissive forces supplement each other when this displacement is converted to the rotation force of the second crank 64. Furthermore, reliability can be improved because if one rod is damaged, the output of the ankle Y-axis speed reducer 58 can still be transmitted to the ankle Y-axis 26RY (26LY) by the other rod.

Furthermore, since the angle formed by the one end 62a, the midpoint 62c, and the other end 62b of the first crank, and the angle formed by the one end 64a, the midpoint 64c, and the other end 64b of the second crank are each set to 180 degrees, or, in other words, the rod mechanism 60 is a parallel link mechanism, no additional stress is applied to the bearing 84 (shown in FIG. 3) for supporting the ankle Y-axis 26RY (26LY) because the transmissive force of the first rod 66 and the transmissive force of the second rod 68 balance each other out (constitute a couple of forces).

Next, the legged mobile robot according to a second embodiment of the present invention will be described.

Figure 5:
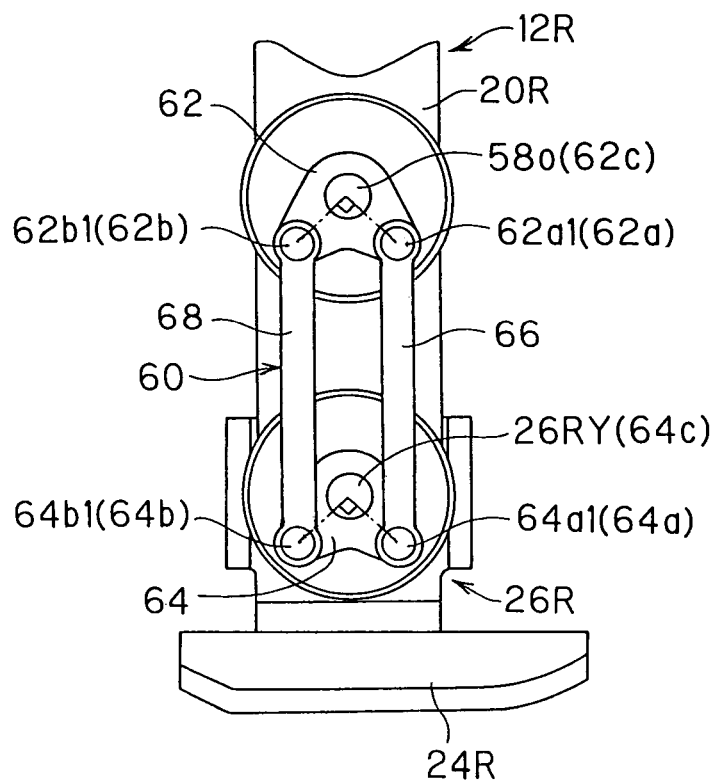
FIG. 5 is a right-hand side view showing the distal end from the shank link of the leg in a legged mobile robot according to a second embodiment of the present invention.
Figure 6:
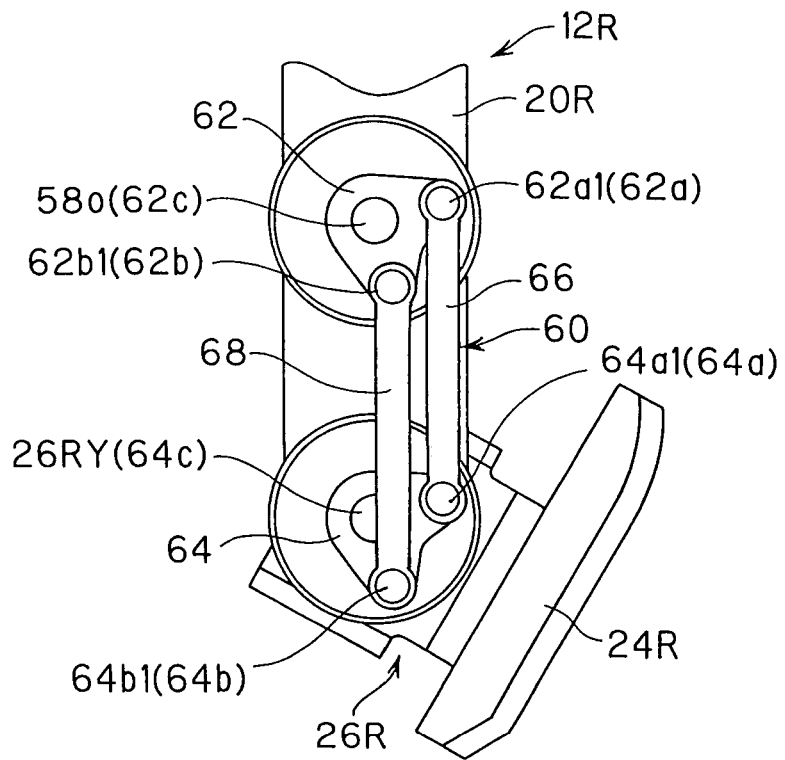
FIG. 6 is a right-hand side view similar to FIG. 4, showing the distal end from the shank link when the Y-axis of the ankle shown in FIG. 5 has been rotated by −60 degrees.

FIG. 5 is a right-hand side view showing the distal end from the shank link of the leg in the legged mobile robot according to the second embodiment, and FIG. 6 is a right-hand side view similar to FIG. 4, showing the distal end from the shank link when the ankle Y-axis has been rotated −60 degrees.

As described in the first embodiment, setting both the angle formed by the one end 62a, the midpoint 62c, and the other end 62b of the first crank, and the angle formed by the one end 64a, the midpoint 64c, and the other end 64b of the second crank to about 180 degrees has the advantage that no additional stress is applied to the bearing 84 for supporting the ankle Y-axis 26RY (26LY) because the transmissive force of the first crank and the transmissive force of the second crank balance each other out (constitute a couple of forces).

However, such a configuration has been inconvenient in that rotation becomes difficult (specifically, a dead point is present) when the one end 62a, the midpoint 62c, and the other end 62b of the first crank, and the one end 64a, the midpoint 64c, and the other end 64b of the second crank are all positioned along the same straight line.

In view of this, in the second embodiment, the angle formed by the one end 62a, the midpoint 62c, and the other end 62b of the first crank 62 is set to 90 degrees, as shown in FIGS. 5 and 6. In other words, the phase difference between the rotational trajectories of the pin joint 62a1 formed at one end of the first crank 62 and the pin joint 62b1 formed at the other end is set to 90 degrees.

similarly, the second crank 64 is configured such that, the angle formed by the one end 64a, the midpoint 64c, and the other end 64b is 90 degrees, or, in other words, the phase difference between the rotational trajectories of the pin joint 64a1 formed at one end of the second crank 64 and the pin joint 64b1 formed at the other end is set to 90 degrees.

In the second embodiment, the dead point is thereby prevented from occurring or existing in the rod mechanism 60, whereby the output (rotation output) of the ankle Y-axis speed reducer 58 can be efficiently converted to the rotational force of the ankle Y-axis 26RY (26LY).

Descriptions of the rest of the configuration and the effects obtained thereby are the same as in the foregoing embodiment, and are therefore omitted.

Next, a legged mobile robot according to a third embodiment of the present invention will be described.

In a legged mobile robot, the torque exerted on the ankle joint is generally determined by the gait pattern. In view of this, the third embodiment is configured such that the angle formed by the one end 62a, the midpoint 62c, and the other end 62b of the first crank, and the angle formed by the one end 64a, the midpoint 64c, and the other end 64b of the second crank vary in response to the gait pattern of the mobile robot 10, or, specifically, the angles are set based on the torque about the ankle Y-axes 26RY and 26LY determined from the gait pattern.

Figure 7:
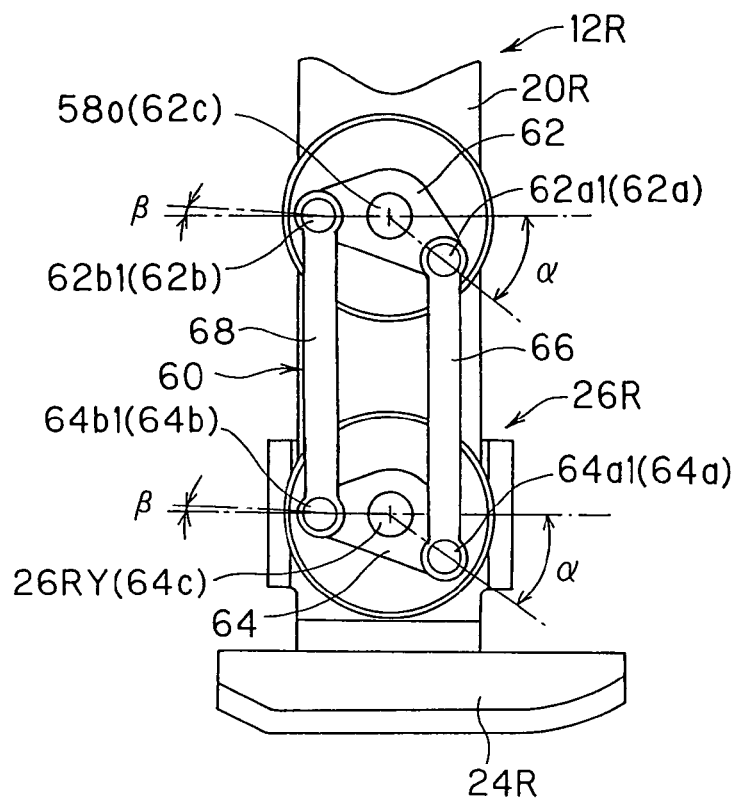
FIG. 7 is a right-hand side view similar to FIG. 5, showing the distal end from the shank link of the leg in a legged mobile robot according to a third embodiment of the present invention.
Figure 8:
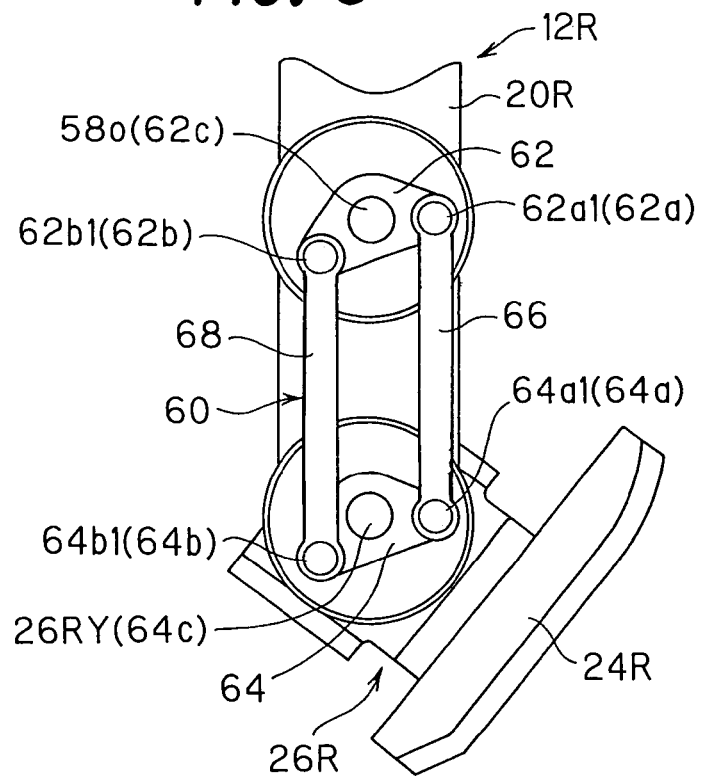
FIG. 8 is a right-hand side view showing the distal end from the shank link when the Y-axis of the ankle shown in the diagrams has been rotated by α degrees.

FIG. 7 is a right-hand side view similar to FIG. 5, showing the distal end from the shank link in the leg of a legged mobile robot according to the third embodiment. FIG. 8 is a right-hand side view showing the distal end from the shank link when the ankle Y-axis has been rotated a degrees.

Before the descriptions of FIGS. 7 and 8 are continued, the torque about the ankle Y-axis 26RY and 26LY generated during the movement or locomotion of the robot 10 will be described with reference to FIG. 9.

Figure 9:
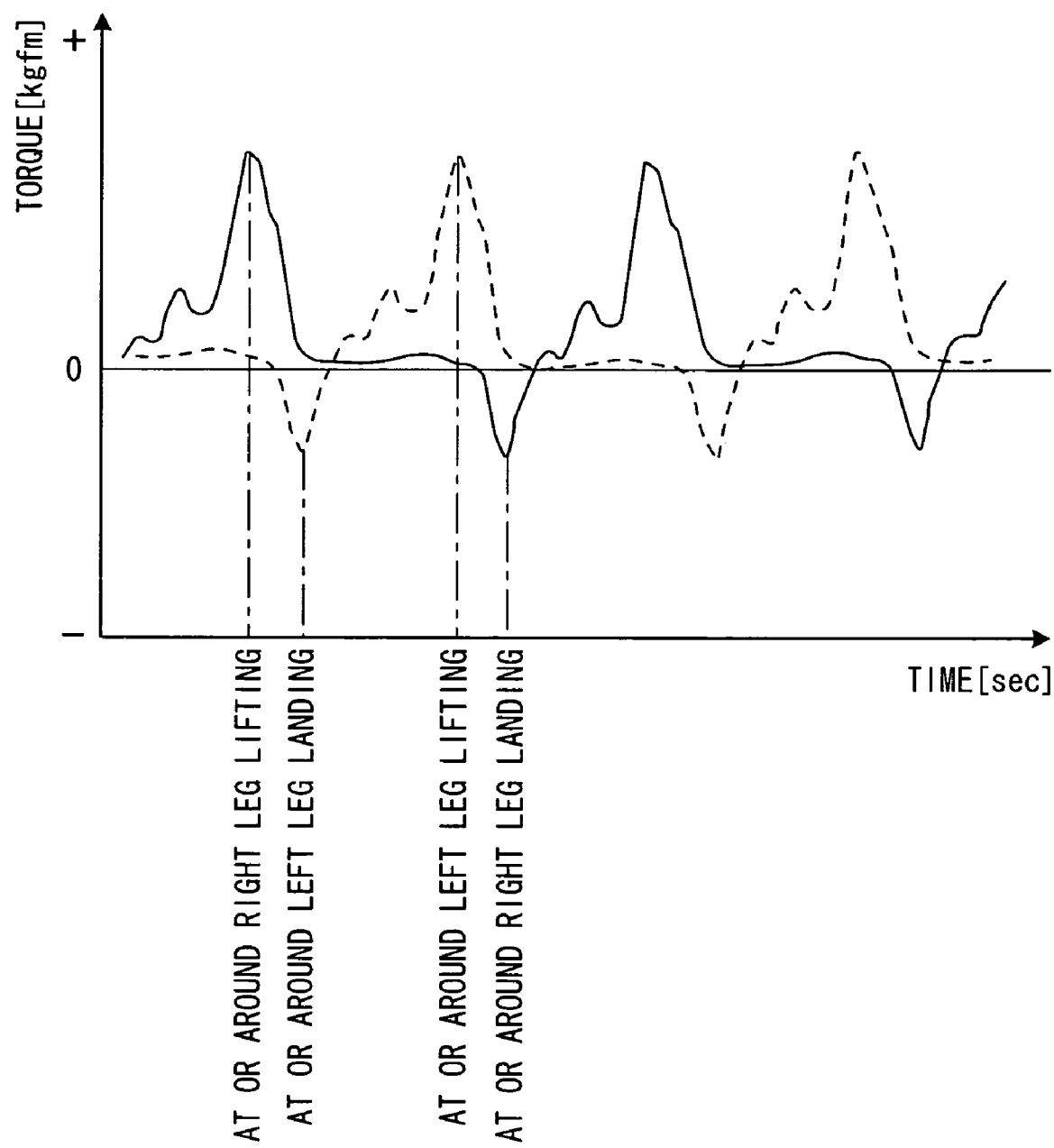
FIG. 9 is a time chart showing the torque about the Y-axis of the ankle applied to the foot when the robot moves.

FIG. 9 is a time chart showing the torque about the ankle Y-axes 26RY and 26LY generated during the movement or locomotion of the robot 10.

The torque about the ankle Y-axes 26RY and 26LY reaches the maximum positive and negative values around the time when the legs 12R and 12L are lifted from the floor and around the time when they are landed on the floor, respectively, as shown in FIG. 9. Specifically, the maximum torque is generated in the positive (plus) direction around the time when the legs 12R and 12L are lifted from the floor, and the maximum torque is generated in the negative (minus) direction around the time when they are landed on the floor. The term "torque in the positive direction" denotes the torque in the direction in which the ankle joints 26R and 26L are extended, and the term "torque in the negative direction" denotes the torque in the direction in which the ankle joints 26R and 26L are bent.

The time at which the output of the ankle Y-axis speed reducer 58 can be converted with maximum efficiency to the rotational force of the ankle Y-axes 26RY and 26LY is when the line that joins the midpoint 62c and the one end 62a (pin joint 62a1) of the first crank, and the line that joins the midpoint 64c and the one end 64a (pin joint 64a1) of the second crank are perpendicular to the first rod 66, or when the line that joins the midpoint 62c and the other end 62b (pin joint 62b1) of the first crank, and the line that joins the midpoint 64c and the other end 64b (pin joint 64b1) of the second crank are perpendicular to the second rod 68.

In view of this, the third embodiment is configured such that the angle formed by the one end 62a, the midpoint 62c, and the other end 62b of the first crank, and the angle formed by the one end 64a, the midpoint 64c, and the other end 64b of the second crank are set so that the conditions described above are fulfilled when maximum torque acts about the ankle Y-axes 26RY and 26LY. In other words, the positions of the two ends of the cranks relative to their midpoints are set such that the output of the ankle Y-axis speed reducer 58 can be converted with maximum efficiency to the rotation force of the ankle Y-axes 26RY and 26LY around the time when the legs 12R and 12L are landed on the floor and around the time when the legs are lifted from the floor, at which maximum torque must be generated in the ankle Y-axes 26RY and 26LY.

Figure 10:
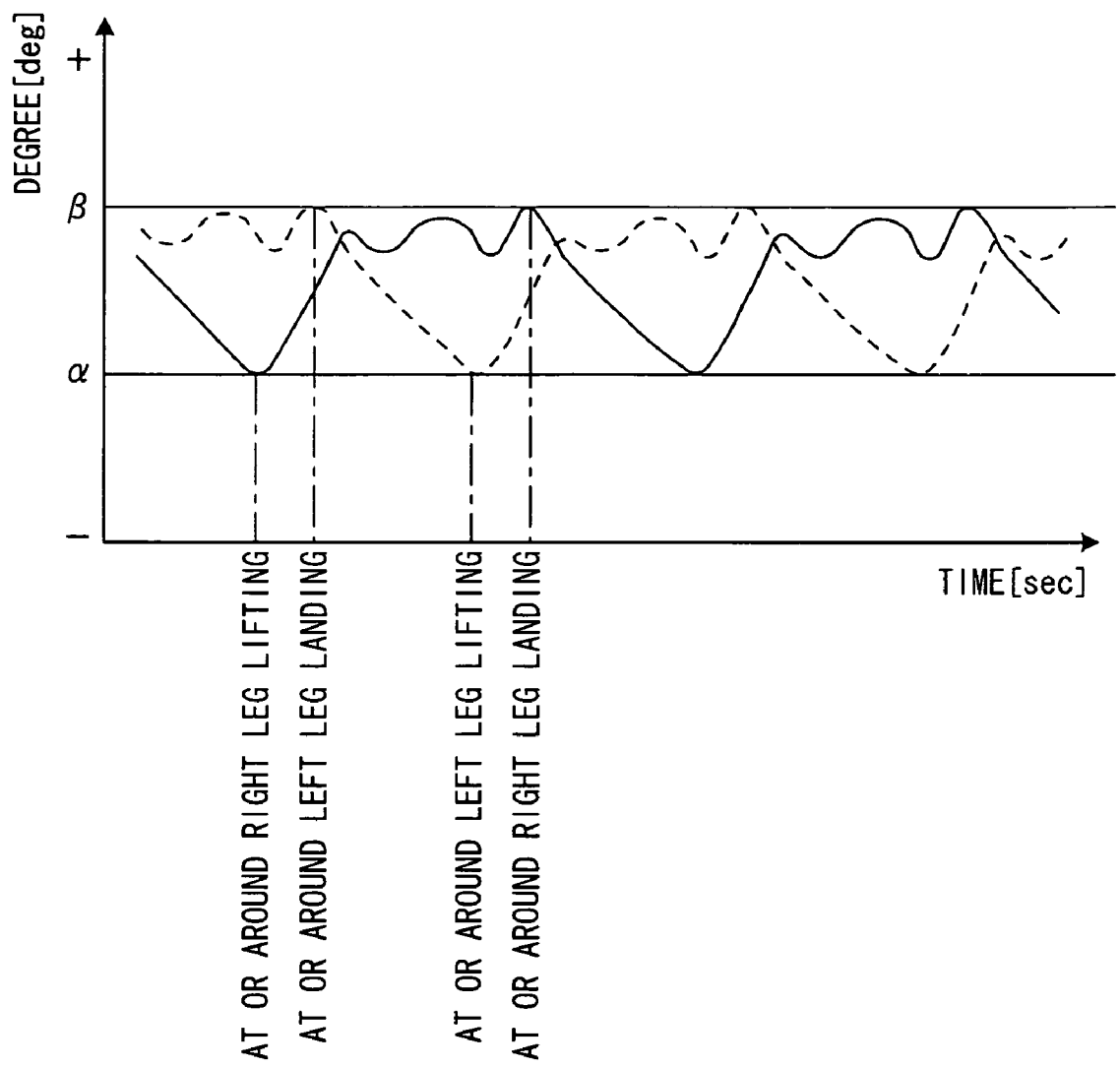
FIG. 10 is a time chart showing the angle of rotation of the Y-axis of the ankle when the robot moves.

FIG. 10 is a time chart showing the rotation angles of the ankle Y-axes 26RY and 26LY when the robot 10 moves. The rotation angles of the ankle Y-axes 26RY and 26LY reach $\alpha$ degrees around the time when the legs 12R and 12L are lifted from the floor, under the action of maximum torque in the positive direction, as shown in FIG. 10. Also, the rotation angles of the ankle Y-axes 26RY and 26LY reach $\beta$ degrees around the time when the legs 12R and 12L are landed on the floor, under the action of maximum torque in the negative direction.

In view of this, the one end 62a of the first crank and the one end 64a of the second crank are set such that the line that joins the one end 62a and the midpoint 62c of the first crank, and the line that joins the one end 64a and the midpoint 64c of the second crank are both perpendicular to the first rod 66 when the rotation angle of the ankle Y-axis 26RY reaches $\alpha$ degrees, as shown in FIGS. 7 and 8.

Also, the other end 62b of the first crank and the other end 64b of the second crank are set such that the line that joins the other end 62b and the midpoint 62c of the first crank, and the line that joins the other end 64b and the midpoint 64c of the second crank are both perpendicular to the second rod 68 when the rotation angle of the ankle Y-axis 26RY reaches $\beta$ degrees.

Specifically, the angle formed by the one end 62a, the midpoint 62c, and the other end 62b of the first crank, and the angle formed by the one end 64a, the midpoint 64c, and the other end 64b of the second crank are each set to $\gamma$ degrees ($\gamma$: $\alpha+\beta$), or, in other words, are set such that the phase difference between the rotational trajectories of the one ends and the other ends is $\gamma$ degrees.

Thus, the third embodiment is configured such that the angle formed by the one end 62a, the midpoint 62c, and the other end 62*b* of the first crank 62, and the angle formed by the one end 64*a*, the midpoint 64*c*, and the other end 64*b* of the second crank 64 vary in response to the gait pattern of the robot 10, or, specifically, the angles are set based on the maximum torque about the ankle Y-axis 26RY (26LY) determined from the gait pattern. The output of the ankle Y-axis speed reducer 58 can thereby be converted with maximum efficiency to the rotation force of the ankle Y-axis 26RY (26LY) around the time when the leg 12R (12L) is landed on the floor and around the time when the leg is lifted from the floor, at which maximum torque must be generated in the ankle Y-axis 26RY (26LY). Therefore, the size of the ankle Y-axis electric motor 42 and the ankle Y-axis speed reducer 58 can be reduced, the weight of the distal end of the leg 12R (12L) can be made smaller to reduce the inertial force generated during movement or locomotion, and the structure can be made more compact to prevent the external appearance of the leg from being adversely affected.

Descriptions of the rest of the configuration and the effects obtained thereby are omitted because they are the same as in the foregoing embodiment.

Next, a legged mobile robot according to a fourth embodiment of the present invention will be described.

As described in the third embodiment, in a legged mobile robot, the torque exerted on the ankle joints is determined by the gait pattern. Therefore, if the gait pattern or navigable environment of the robot changes, the rotation angle of the ankle Y-axis in which the maximum torque must be generated also changes. Therefore, it is preferable that the angles formed by the one ends, the midpoints, and the other ends of the cranks be easily varied.

In view of this, the fourth embodiment is configured such that the first crank 62 and the second crank 64 are both provided with an angle varying mechanism for varying the angles formed by the one ends, the midpoints, and the other ends thereof.

Figure 11:
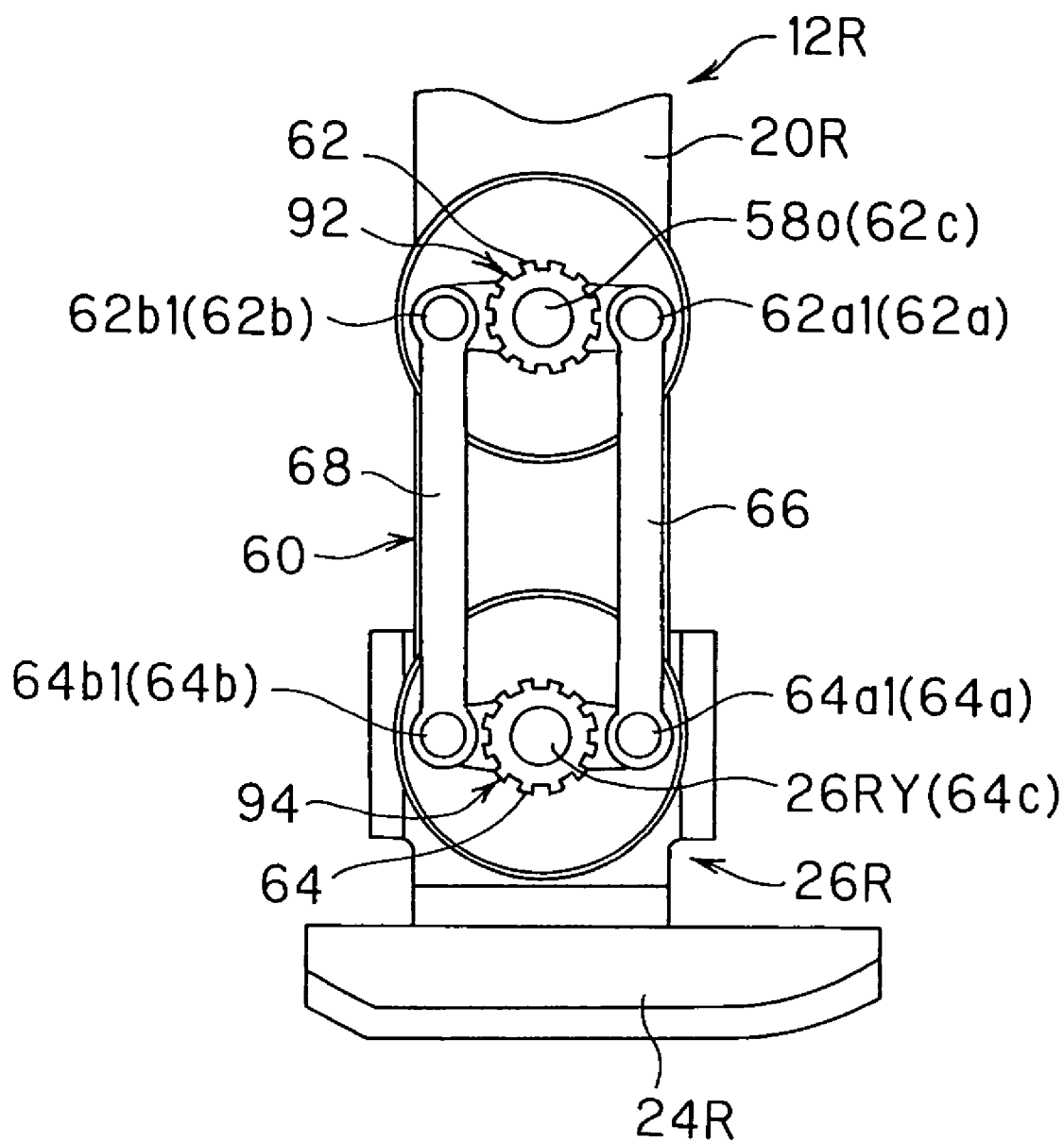
FIG. 11 is a right-hand side view similar to FIG. 5, showing the distal end from the shank link of the leg in a legged mobile robot according to a fourth embodiment of the present invention.

FIG. 11 is a right-hand side view similar to FIG. 5, showing the distal end from the shank link in the leg of a legged mobile robot according to the fourth embodiment.

The first crank 62 includes an angle varying mechanism 92 for varying the angle formed by the one end 62*a*, the midpoint 62*c*, and the other end 62*b* thereof, as shown in FIG. 11. Also, the second crank 64 has an angle varying mechanism 94 for varying the angle formed by the one end 64*a*, the midpoint 64*c*, and the other end 64*b* thereof.

Figure 12:
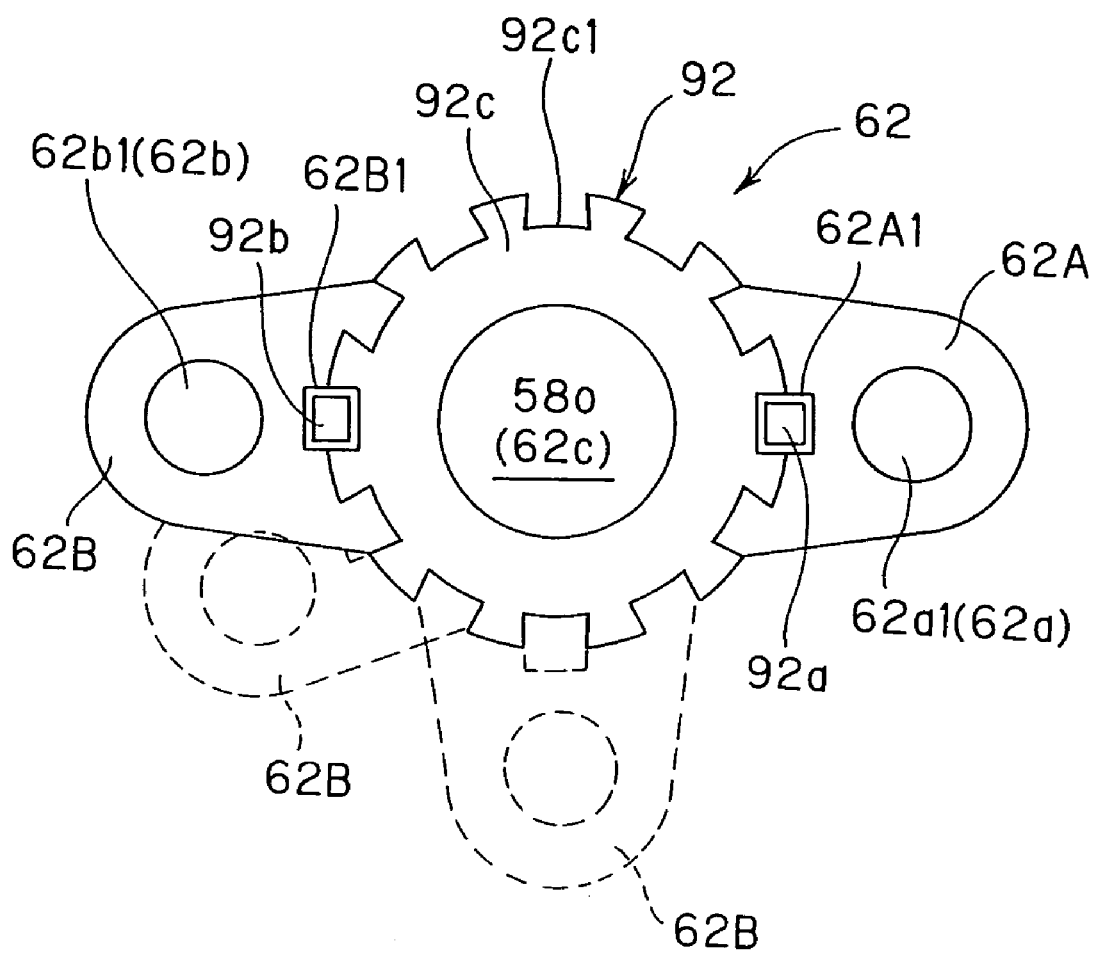
FIG. 12 is an enlarged explanatory diagram of the first crank shown in FIG. 11.

FIG. 12 is an enlarged explanatory diagram of the first crank 62.

The first crank 62 is divided into a first arm 62A on the side of the one end 62*a*, and a second arm 62B on the side of the other end 62*b*, as illustrated. The first arm 62A and the second arm 62B are rotatably mounted to the output shaft 58*o* of the ankle Y-axis speed reducer. Also, a hole 62A1 and a hole 62B1 are provided to the first arm 62A and the second arm 62B, respectively.

The angle varying mechanism 92 includes a key 92*a* to be inserted into the aforementioned hole 62A1, a key 92*b* to be inserted into the hole 62B1, and a spline 92*c* fixed to the output shaft 58*o* of the ankle Y-axis speed reducer. Specifically, the first arm 62A is rotated to align the hole 62A1 and any one of grooves 92*c*1 in the spline 92*c*, and then the key 92*a* is inserted into the hole 62A1 and the groove 92*c*1 aligned therewith, whereby the first arm 62A can be fixed at an arbitrary angle.

The same applies to the second arm 62B. The second arm 62B is rotated to align the hole 62B1 with the arbitrary groove 92*c*1 in the spline 92*c*, and the key 92*b* is then inserted into the hole 62B1 and the groove 92*c*1 aligned therewith, whereby the second arm 62B can be fixed at an arbitrary angle as shown by the dotted lines in the diagram. In other words, the angle formed by the one end 62*a*, the midpoint 62*c*, and the other end 62*b* of the first crank can be varied and set to an arbitrary angle.

In FIG. 12, the key 92*a* and the key 92*b* are displayed as being small compared to the hole 62A1, the hole 62B1, and the groove 92*c*1, but this representation is configured to aid in understanding, and in actuality these members are formed to be in contact with each other without any gaps.

Figure 13:
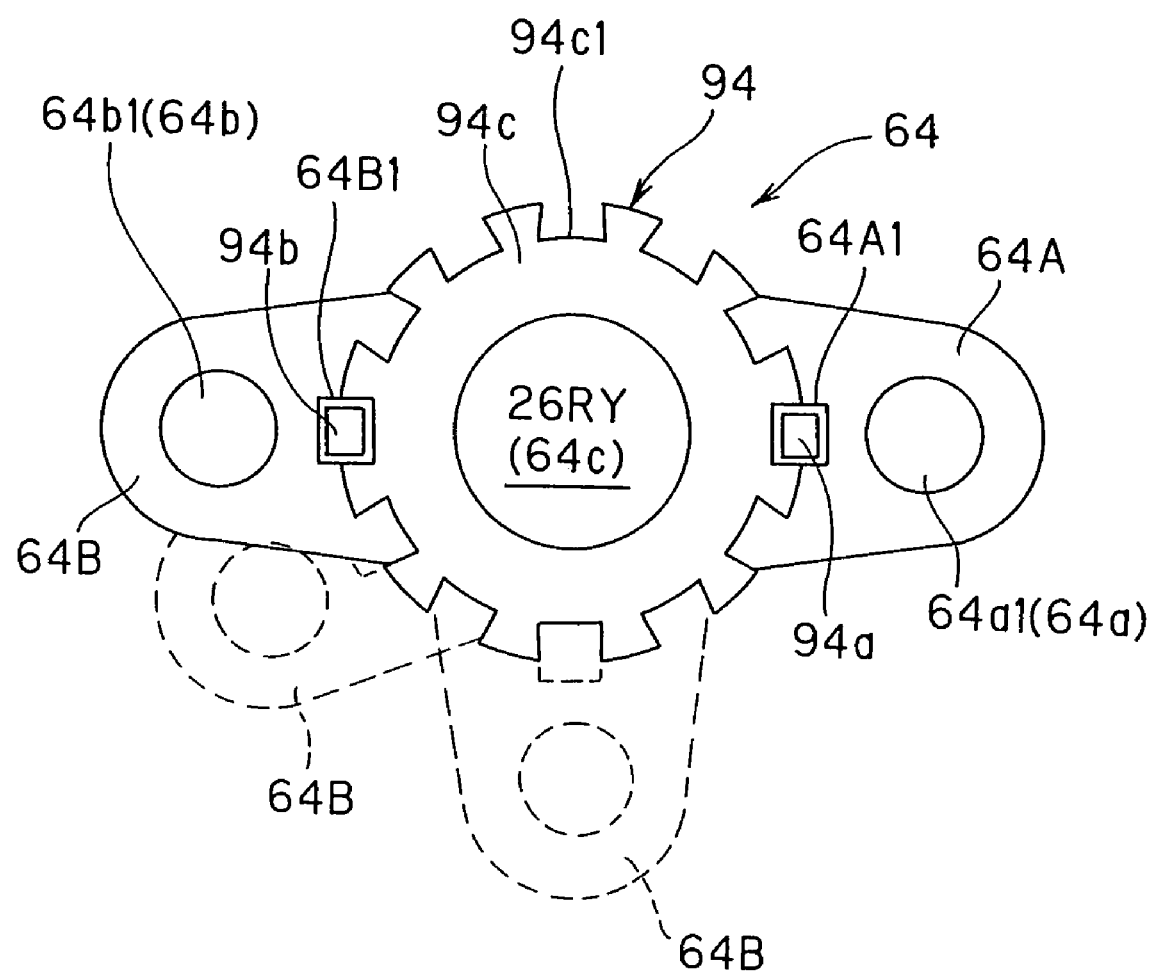
FIG. 13 is an enlarged explanatory diagram of the second crank shown in FIG. 11.

FIG. 13 is an enlarged view of the second crank 64.

The second crank 64 is divided into a first arm 64A on the side of the one end 64*a*, and a second arm 64B on the side of the other end 64*b* in the same manner as the first crank 62, and these arms are rotatably mounted on the ankle Y-axis 26RY, as shown in FIG. 13. Also, a hole 64A1 and a hole 64B1 are provided to the first arm 64A and the second arm 64B, respectively.

The angle varying mechanism 94 includes a key 94*a* to be inserted into the aforementioned hole 64A1, a key 94*b* to be inserted into the hole 64B1, and a spline 94*c* fixed to the ankle Y-axis 26RY, whereby the first arm 64A is rotated to align the hole 64A1 and an arbitrary groove 94*c*1 in the spline 94*c*, and then the key 94*a* is inserted into the hole 64A1 and the groove 94*c*1 aligned therewith, whereby the first arm 64A can be fixed at an arbitrary angle.

The same applies to the second arm 64B. The second arm 64B is rotated to align the hole 64B 1 with the arbitrary groove 94*c*1 in the spline 94*c*, and the key 94*b* is then inserted into the hole 64B1 and the groove 94*c*1 aligned therewith, whereby the second arm 64B can be fixed at an arbitrary angle as shown by the dotted lines in the diagram. In other words, the angle formed by the one end 64*a*, the midpoint 64*c*, and the other end 64*b* of the second crank can be varied and set to an arbitrary angle.

In FIG. 13, the key 94*a* and the key 94*b* are displayed as being small compared to the hole 64A1, the hole 64B1, and the groove 94*c*1, but this representation is designed to aid in understanding, and in actuality these members are formed to be in contact with each other without any gaps.

Thus, in the fourth embodiment, the angles can be easily varied because the first crank 62 and second crank 64 are provided respectively with angle varying mechanisms 92 and 94 for varying the angles formed by the one ends 62*a* and 64*a*, the midpoints 62*c* and 64*c*, and the other ends 62*b* and 64*b*.

Descriptions of the rest of the configuration and the effects obtained thereby are omitted because they are the same as in the foregoing embodiment.

Thus, the first to the fourth embodiments of the present invention are configured to have a legged mobile robot 10 having a leg 12R (12L) including a knee joint 22R (22L) that connects a thigh link 16R (16L) and a shank link 20R (20L) and an ankle joint 26R (26L) that connects the shank link and a foot 24R (24L), such that it moves by driving the leg, comprising: a motor (ankle Y-axis electric motor 42) that rotates the ankle joint about a right-and-left axis (ankle Y-axis 26RY (26LY)) of the robot, and a speed reducer (ankle Y-axis speed reducer 58) that reduces speed of an output of the motor, wherein the motor is disposed at a same position as the knee joint or at the thigh link such that the speed reducer is disposed at the shank link.

Also, they are configured such that, the motor is disposed at the thigh link, and the output of the motor is transmitted to the speed reducer through an intermediate shaft (ankle Y-axis intermediate shaft 54) disposed coaxially with an axis of the knee joint (knee Y-axis 22RY (22LY)).

Also, they are configured such that, at least one of a first transmission element (second ankle Y-axis belt 56) that transmits rotation of the intermediate shaft to the speed reducer, and a second transmitting element (rod mechanism 60) that transmits an output of the speed reducer to the right-and-left axis of the ankle joint, specifically, the first transmission element, is disposed inside the shank link.

Furthermore, they are configured such that, the second transmission element comprises a rod mechanism 60 that connects the output shaft 58o of the speed reducer to the right-and-left axis of the ankle joint by a rod (first rod 66 and second rod 68).

Furthermore, they are configured such that, the rod mechanism comprises: a first crank 62 whose midpoint 62c is fixed to the output shaft of the speed reducer, a second crank 64 whose midpoint 64c is fixed to the right-and-left axis of the ankle joint, a first rod 66 connected to one end 62a of the first crank and connected to one end 64a of the second crank, and a second rod 68 connected to the other end 62b of the first crank and connected to the other end 64b of the second crank.

Also, they are configured such that, a distance between the first rod 66 and the second rod 68 is set to a value smaller than a width of the shank link (the width in the back-and-forth direction).

Also, the first embodiment is configured such that, an angle formed by the one end 62a, the midpoint 62c and the other end 62b of the first crank, and an angle formed by the one end 64a, the midpoint 64c and the other end 64b of the second crank are each set to approximately 180 degrees.

Also, the third and fourth embodiments are configured such that, an angle formed by the one end 62a, the midpoint 62c and the other end 62b of the first crank, and an angle formed by the one end 64a, the midpoint 64c and the other end 64b of the second crank are varied in response to a gait when the robot moves.

Also, in this configuration, the angle formed by the one end 62a, the midpoint 62c and the other end 62b of the first crank, and the angle formed by the one end 64a, the midpoint 64c and the other end 64b of the second crank are set based on a torque exerted on the foot around a time when the leg is landed on a floor and around a time when the leg is lifted from the floor, specifically, based on maximum torque exerted about the ankle Y-axis 26RY (26LY).

Also, the fourth embodiment is configured such that, it further includes: an angle vary mechanism 92 (94) provided at the first crank 62 and second crank 64 and varying the angles formed by the one ends, the midpoints, and the other ends of the first and second cranks.

Also, the first to the fourth embodiments are configured to have a legged mobile robot 10 having a leg 12R (12L) including a knee joint 22R (22L) that connects a thigh link 16R (16L) and a shank link 20R (20L) and an ankle joint 26R (26L) that connects the shank link and a foot 24R (24L), such that it moves by driving the leg, comprising: a first motor (ankle Y-axis electric motor 42) that rotates the ankle joint about a right-and-left axis of the robot (ankle Y-axis 26RY (26LY)), and a second motor (ankle X-axis electric motor 40) that rotates the ankle joint about a back-and-forth axis of the robot (ankle X-axis 26RX (26LX)), wherein the first and second motors are disposed at the thigh link such that an output of the first motor is transmitted to the right-and-left axis of the ankle joint through a first intermediate shaft (ankle Y-axis intermediate shaft 54) disposed a same axis as the ankle joint (knee Y-axis 22RY (22LY)), while an output of second motor is transmitted to the back-and-forth axis of the ankle joint through a second intermediate shaft (ankle X-axis intermediate shaft 74) disposed on the same axis as the ankle joint.

Also, the first through fourth embodiments are configured to have a legged mobile robot 10 having a leg 12R (12L) including a knee joint 22R (22L) that connects a thigh link 16R (16L) and a shank link 20R (20L) and an ankle joint 26R (26L) that connects the shank link and a foot 24R (24L), such that it moves by driving the leg, comprising: a first motor (ankle Y-axis electric motor 42) (ankle Y-axis electric motor 42) that rotates the ankle joint about a right-and-left axis of the robot (ankle Y-axis 26RY (26LY)), and a second motor (ankle X-axis electric motor 40) that rotates the ankle joint about a back-and-forth axis of the robot (ankle X-axis 26RX (26LX)), wherein the first motor is disposed at a same position as the knee joint or at the thigh link in such a manner that the first motor is disposed at the thigh link at a position that is farther away from the knee joint than the second motor (i.e., on the side of the hip joints 18R and 18L).

It should be noted in the above, although a biped walking robot with two legs has been described as an example of a legged mobile robot, the robot may also be a legged mobile robot with one or three or more legs.

It should also be noted that, although the ankle Y-axis electric motor 42 and the ankle X-axis electric motor 40 has been both disposed at the thigh links 16R and 16L, they may also be disposed at the same position as the knee joints 22R and 22L.

It should further be noted that, of the second ankle Y-axis belt 56 and the rod mechanism 60, although only the second ankle Y-axis belt 56 has been disposed in the interior of the shank links 20R and 20L, both these devices or only the rod mechanism 60 may be disposed in the interior of the shank links 20R and 20L.

It should further be noted that, although the angle formed by one end 62a, the midpoint 62c, and the other end 62b of the first crank, and the angle formed by the one end 64a, the midpoint 64c, and the other end 64b of the second crank are each set to 180 degrees, these angles need not be set to exactly 180 degrees, and the desired effects can be sufficiently obtained if the angles are set to approximately 180 degrees.

It should further be noted that, the angle formed by one end 62a, the midpoint 62c, and the other end 62b of the first crank, and the angle formed by the one end 64a, the midpoint 64c, and the other end 64b of the second crank are not limited to the angles described above and should be appropriately set according to the gait pattern or the navigable environment of the robot 10.

It should further be noted that, the angle varying mechanisms 92 and 94 are not limited to the configurations described above, and any configuration can be employed as long as the angles of the first arm and the second arm can be arbitrarily varied and fixed.

It should further be noted that, the motor used herein is not limited to an electric motor, and may also be a hydraulic motor or the like.

INDUSTRIAL FIELD IN WHICH THE INVENTION IS APPLICABLE

In the legged mobile robot according to the present invention, since the motor for rotating the ankle joint of the robot about the right-and-left axis is disposed at the same position as the knee joint or at the thigh link, and the speed reducer for reducing the speed of the output of the motor is disposed at the shank link, the distal end of the leg can be made more lightweight, whereby the inertial force generated in the leg of the mobile robot can be reduced.

The invention claimed is:

1. A legged mobile robot having a leg including a knee joint that connects a thigh link and a shank link and an ankle joint that connects the shank link and a foot, such that it moves by driving the leg, comprising:
   a motor that rotates the ankle joint about a right-and-left axis of the robot, and
   a speed reducer that reduces speed of an output of the motor,
   wherein the motor is disposed at a same position as the knee joint or at the thigh link such that the speed reducer is disposed at the shank link, and
   wherein rotating the ankle joint comprises producing a change in the relative position and/or angle between the foot and the shank link.

2. The legged mobile robot according to claim 1, wherein the motor is disposed at the thigh link, and the output of the motor is transmitted to the speed reducer through an intermediate shaft disposed coaxially with an axis of the knee joint.

3. The legged mobile robot according to claim 2, wherein at least one of a first transmission element that transmits rotation of the intermediate shaft to the speed reducer, and a second transmitting element that transmits an output of the speed reducer to the right-and-left axis of the ankle joint, is disposed inside the shank link.

4. The legged mobile robot according to claim 3, wherein the second transmission element comprises a rod mechanism that connects the output shaft of the speed reducer to the right-and-left axis of the ankle joint by a rod.

5. The legged mobile robot according to claim 4, wherein the rod mechanism comprises:
   a first crank whose midpoint is fixed to the output shaft of the speed reducer,
   a second crank whose midpoint is fixed to the right-and-left axis of the ankle joint,
   a first rod connected to one end of the first crank and connected to one end of the second crank, and
   a second rod connected to the other end of the first crank and connected to the other end of the second crank.

6. The legged mobile robot according to claim 5, wherein a distance between the first rod and the second rod is set to a value smaller than a width of the shank link.

7. The legged mobile robot according to claim 5, wherein an angle formed by the one end, the midpoint and the other end of the first crank, and an angle formed by the one end, the midpoint and the other end of the second crank are each set to approximately 180 degrees.

8. The legged mobile robot according to claim 6, wherein an angle formed by the one end, the midpoint and the other end of the first crank, and an angle formed by the one end, the midpoint and the other end of the second crank are each set to approximately 180 degrees.

9. The legged mobile robot according to claim 5, wherein an angle formed by the one end, the midpoint and the other end of the first crank, and an angle formed by the one end, the midpoint and the other end of the second crank are varied in response to a gait when the robot moves.

10. The legged mobile robot according to claim 6, wherein an angle formed by the one end, the midpoint and the other end of the first crank, and an angle formed by the one end, the midpoint and the other end of the second crank are varied in response to a gait when the robot moves.

11. The legged mobile robot according to claim 9, wherein the angle formed by the one end, the midpoint and the other end of the first crank, and the angle formed by the one end, the midpoint and the other end of the second crank are set based on a torque exerted on the foot around a time when the leg is landed on a floor and around a time when the leg is lifted from the floor.

12. The legged mobile robot according to claim 10, wherein the angle formed by the one end, the midpoint and the other end of the first crank, and the angle formed by the one end, the midpoint and the other end of the second crank are set based on a torque exerted on the foot around a time when the leg is landed on a floor and around a time when the leg is lifted from the floor.

13. The legged mobile robot according to claim 9, further including:
   an angle vary mechanism provided at the first crank and second crank and varying the angles formed by the one ends, the midpoints, and the other ends of the first and second cranks.

14. The legged mobile robot according to claim 10, further including:
   an angle vary mechanism provided at the first crank and second crank and varying the angles formed by the one ends, the midpoints, and the other ends of the first and second cranks.

15. The legged mobile robot according to claim 11, further including:
   an angle vary mechanism provided at the first crank and second crank and varying the angles formed by the one ends, the midpoints, and the other ends of the first and second cranks.

16. The legged mobile robot according to claim 12, further including:
   an angle vary mechanism provided at the first crank and second crank and varying the angles formed by the one ends, the midpoints, and the other ends of the first and second cranks.

17. A legged mobile robot having a leg including a knee joint that connects a thigh link and a shank link and an ankle joint that connects the shank link and a foot, such that it moves by driving the leg, comprising:
   a first motor that rotates the ankle joint about a right-and-left axis of the robot, and
   a second motor that rotates the ankle joint about a back-and-forth axis of the robot,
   wherein the first and second motors are disposed at the thigh link such that an output of the first motor is transmitted to the right-and-left axis of the ankle joint through a first intermediate shaft disposed on a same axis as the ankle joint, while an output of second motor is transmitted to the back-and-forth axis of the ankle joint through a second intermediate shaft disposed on the same axis as the ankle joint.

18. A legged mobile robot having a leg including a knee joint that connects a thigh link and a shank link and an ankle joint that connects the shank link and a foot, such that it moves by driving the leg, comprising:
   a first motor that rotates the ankle joint about a right-and-left axis of the robot, and
   a second motor that rotates the ankle joint about a back-and-forth axis of the robot,
   wherein the first motor is disposed at a same position as the knee joint or at the thigh link in such a manner that the first motor is disposed at the thigh link at a position that is farther away from the knee joint than the second motor.

* * * * *